Jan. 5, 1965        J. HULETT        3,164,820

FROST, SNOW AND ICE DETECTOR

Filed Oct. 11, 1961        2 Sheets-Sheet 1

INVENTOR
JACK HULETT
BY Scrivener & Parker
ATTORNEYS

Jan. 5, 1965 J. HULETT 3,164,820
FROST, SNOW AND ICE DETECTOR
Filed Oct. 11, 1961 2 Sheets-Sheet 2

INVENTOR
JACK HULETT

BY Scrivener & Parker
ATTORNEYS 3,164,820
FROST, SNOW AND ICE DETECTOR
Jack Hulett, Houston, Tex., assignor to Kar-Trol Signal
  Co. Inc., Houston, Tex., a corporation of Texas
          Filed Oct. 11, 1961, Ser. No. 144,479
              6 Claims. (Cl. 340—234)

This invention provides a system for detecting the occurrence of snow, frost, ice or icing conditions on a surface such as that of a bridge or roadway, and for giving an indication of the presence of such a condition.

In the system provided by the invention two sensing transducers are provided which are respectively sensitive to moisture and temperature, and each transducer has an individual output amplifier and relay circuit associated with it, whereby simultaneous output signals from the two transducers may be utilized and combined to indicate the presence of such moisture and low temperature conditions which will produce snow, frost, ice or icing conditions.

In the drawings forming part of this specification:

Figure 1:
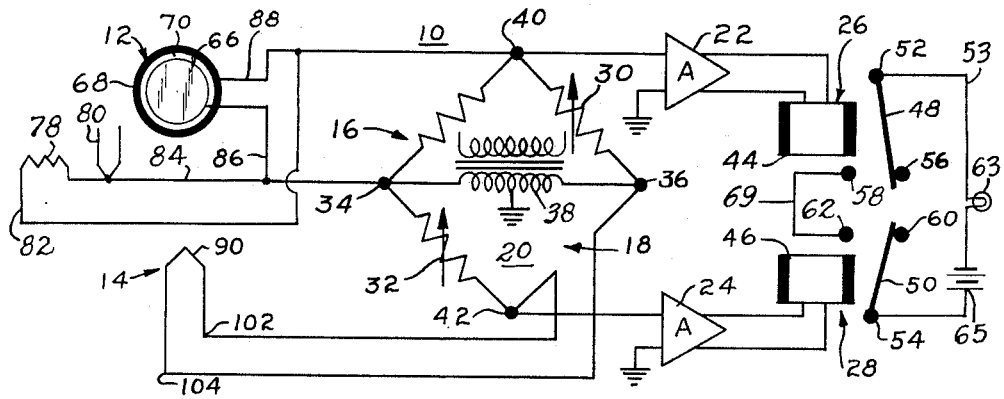
FIG. 1 is a circuit diagram of the invention.

In FIG. 1 of the drawings the detector system 10 of the invention is shown as comprising a first or moisture sensing transducer 12, a second or temperature sensing transducer 14, these being connected in circuit as elements in the arms 16 and 18, respectively, of an impedance bridge 20, and a pair of output amplifiers 22, 24 responsive to the output variations of the first and second transducers 12 and 14, respectively, the output of each of the said amplifiers 22 and 24 being connected, respectively, to the operating coil of one of a pair of relays 26 and 28.

The bridge 20 is a conventional four arm circuit having one pair of oppositely disposed resistance arms 16, 18 and another pair of oppositely disposed resistance arms 30, 32. Each arm 30, 32 includes a variable resistance. The power input terminals of the bridge comprise a pair of diagonally opposed terminals 34, 36 having a transformer secondary 38 connected therebetween and grounded at its center. The transformer secondary comprises a portion of an A.C. power supply, not shown, which supplies the necessary operating power to the system.

The signal output terminals of the bridge circuit 20 comprise a pair of diagonally opposed terminals 40, 42 connected, respectively, to the amplifiers 22, 24.

The relays 26, 28 comprise operating coils 44, 46, which are connected, respectively, to the amplifiers 22, 24, and individual switch armatures 48, 50 of the double throw single pole type, each pivoting about one of terminals 52, 54 and operating between a pair of contact terminals 56, 58 and 60, 62. Relay contacts 52, 54 are connected by lead 53 in circuit with a signal 63 and electrical source 65 and when both relays 26, 28 are energized armatures 48, 50 are moved into engagement with relay contacts 58, 62, which are connected by lead 69, completing the signal circuit and operating the signal.

Figure 2:
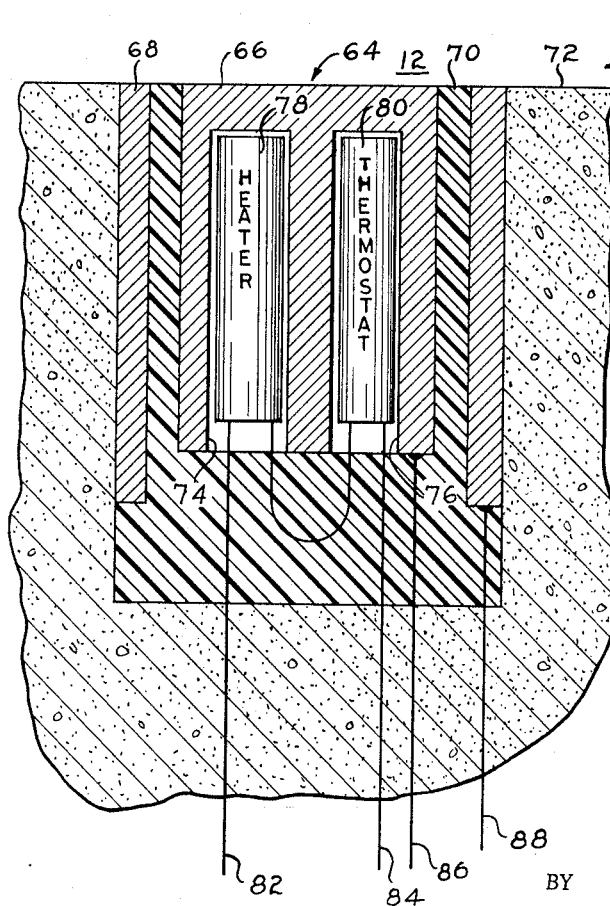
FIG. 2 is a detailed showing partially in cross-section of one of the transducers of the invention embedded in a surface.

The moisture transducer 12 is shown in FIG. 2 as comprising a pair of concentrically disposed exposed circular contacts 66, 68 held together and separated by a molded insulator 70 the three parts being connected in the form of a cylinder 64. This cylinder is embedded in a road surface 72 or the like with the exposed surfaces of the contacts 66, 68 and the insulator 70 mounted flush with the road surface. Thus, any moisture on the road surface 72 will bridge the gap between the circular contacts 66, 68 formed by the insulator 70 to create a closed circuit between the contacts.

Figure 3:
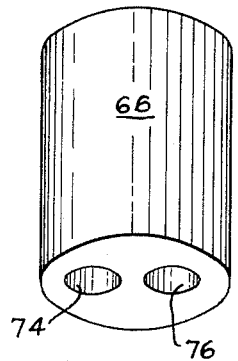
FIG. 3 is a perspective view of a part shown in FIG. 2.

As shown in FIGS. 2 and 3, the external contact 68 comprises a metal tube, while the internal contact 66 comprises a metallic cylinder having a pair of diametrically spaced longitudinal bores or chambers 74, 76 therein. In order to permit the moisture detector 64 to properly detect the presence of moisture on the road surface 72, an electric tubular heater 78 and a tubular thermostatic control switch 80 connected in series therewith are enclosed, respectively, in the bores 74, 76. The thermostat is set to keep the detector unit 64 at a temperature closely above the freezing temperature of water, such as 38 degrees Fahrenheit, whereby snow or ice on the road surface 72 and the detector 64 will be sufficiently melted to be changed to water.

A pair of output leads 82, 84 from the heater 78 and thermostatic switch 80, respectively, provide the power connections therefor. The contacts 66 and 68 are also provided with leads 86 and 88, respectively, which connect them with terminals 34 and 40 of the bridge circuit 20.

Figure 4:
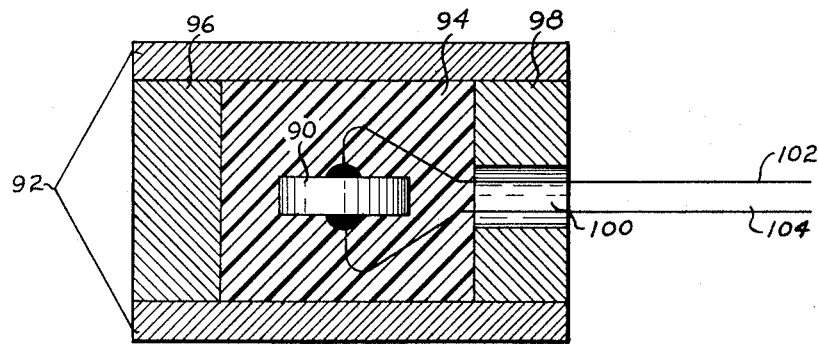
FIG. 4 is a cross sectional view of the other of the transducers of the invention.

In FIG. 4 the temperature transducer 14 is shown as comprising a thermistor 90 enclosed in a cylindrical shell 92 of metal having good heat transfer characteristics and being embedded in the road surface. The metal shell 92 is filled with an insulating material 94 in which the thermistor 90 is embedded, the insulating material 94 also having good heat transfer characteristics and being held in place in the shell 92 by a pair of metallic end caps 96 and 98. The end cap 98 is provided with an insulated bore 100 through which pass a pair of leads 102, 104 which connect the thermistor 90 and the terminals 42, 36, respectively, of the bridge circuit 20. The thermistor 90 acts to increase its resistance with a decrease in temperature to cause an impedance variation in the arm 18 of the bridge circuit 20 whereby an output signal will appear at the terminal 42 of the bridge 20 in proportion to the impedance variation.

Figure 5:
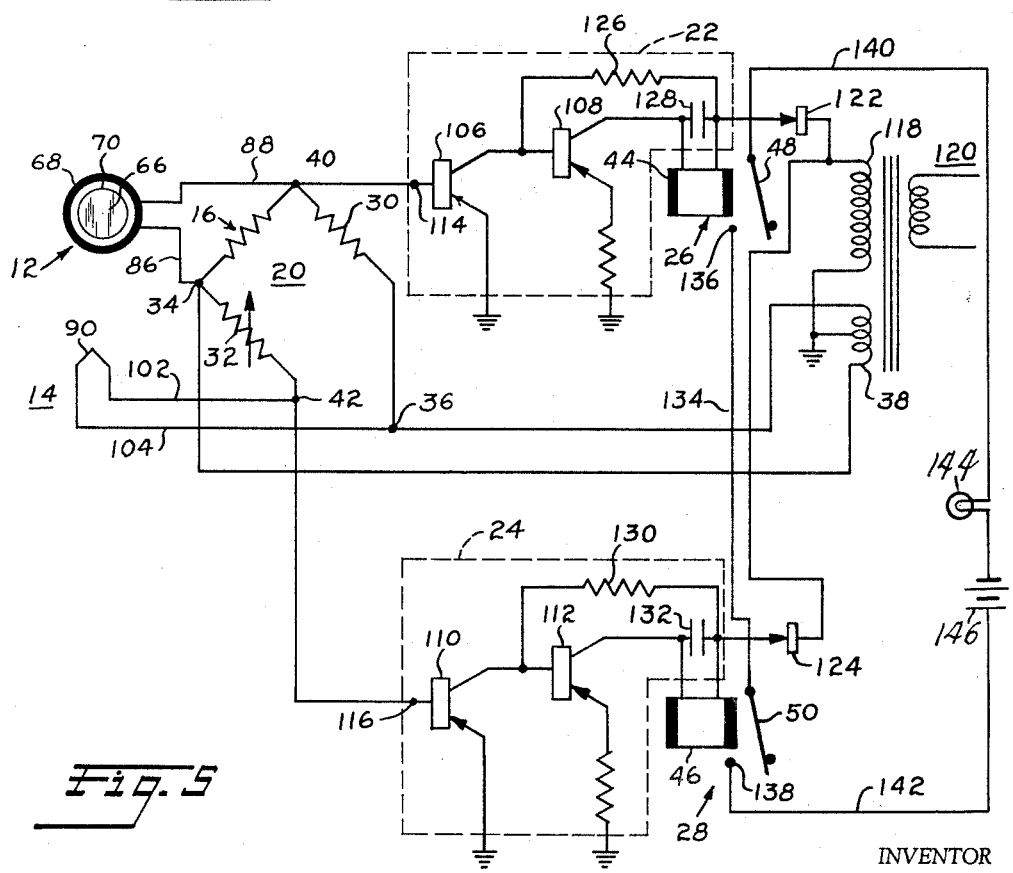
FIG. 5 is a circuit diagram of a preferred embodiment of the invention.

A circuit diagram of a preferred embodiment of the invention is shown in FIG. 5. Each of the amplifiers 22 and 24 is shown in FIG. 5 as comprising a pair of cascaded P-N-P transistors 106, 108 and 110, 112, respectively. The output terminals 40 and 42 of the bridge circuit 20 are connected with the base electrodes 114, 116, respectively, of the transistors 106, 110 in the amplifiers 22 and 24, whereby the respective responses of the transducers 12 and 14 to the conditions on the surface 72 may be detected.

The coil 44 of a relay 26 is connected as the output load in the collector circuit of the transistor 108 in the first amplifier 22, while the coil 46 of a second relay 28 is connected as the output load in the collector circuit of the transistor 112 in the second amplifier 24.

Operating power for both the amplifiers 22, 24 is provided through a secondary winding 118 of a transformer, 120 of which the center-tapped secondary winding 38 in the bridge circuit 20 is also a part. The winding 118 is connected to the collector electrodes of the transistors in the amplifiers 22, 24 by rectifier means 122, 124, respectively, and suitable impedances between each of the collector electrodes and said rectifiers are provided, such as the resistor 126 and capacitor 128 in the first amplifier 22 and the resistor 130 and capacitor 132 in the second amplifier 24.

Armature 48 of relay 26 is connected by lead 140 to a signal 144 and electrical source 146 and, through lead 142, to terminal 138 of relay 28, while armature 50 of relay 28 is connected by lead 134 to contact 136 of relay 26.

Operation

In operation, referring to FIGS. 2, 4 and 5, the moisture transducer 12 is kept at approximately 38 degrees Fahrenheit by the action of the tubular heater 78 therein as controlled by the automatic cycling of the thermostatic control switch 80. This assures that any ice, snow or frost on the road surface 72, which is also present on the flush mounted transducer 12, will be melted to form moisture and bridge the gap between the electrodes 66, 68 across the intermediate dielectric 70. This temperature causes melting but is low enough not to cause evaporation of the moisture present on the moisture transducer 12.

The temperature transducer 14 is chosen so that by adjustment of the variable resistors 30, 32 of the bridge circuit 20, the bridge will be sufficiently in balance so as not to apply a signal from the bridge output terminal 42 to the base electrode 116 of the first transistor 110 in the second amplifier 24 of a strength sufficient to energize the said second amplifier and the second relay 28 associated therewith until the thermistor 90 presents a resistance in the arm 18 of the bridge 20 of a magnitude representative of a surface temperature equal to or below the freezing temperature of water.

Assuming that snow, ice, frost or rain are present on the road surface 72, and the surface temperature is below or equal to freezing, the moisture transducer 12, in response to the electrodes 66, 68 thereof being bridged by moisture, will effect a resistance change in the arm 16 of the bridge 20 between the terminals 34, 40 thereof and the temperature transducer 14 will present a resistance in the bridge arm 18 of the bridge 20 between the terminals 36 and 42 thereof to unbalance said bridge and cause it to produce output signals at the terminals 40 and 42.

The output signal at the terminal 40 is fed to the base electrode 114 of the first transistor 106 of the first amplifier 22, causing the first transistor 106 to conduct and bias the second transistor 108 into conduction, thus energizing the coil 44 of relay 26, causing the armature 48 of relay 26 to connect the lead 140 to lead 134 through the armature 48 and the contact 136.

The output signal at the terminal 42 of the bridge 20 is fed to the base electrode 116 of the first transistor 110 of the second amplifier 24, causing the transistor to conduct and bias the second transistor 112 into conduction, thus energizing the coil 46 of the second relay 28. When both relays 26 and 28 are energized a circuit is completed through armature 48, lead 140, signal 144, source 146, lead 142, relay contact 138, armature 50, and lead 134, energizing the signal 144.

While I have described and illustrated one form which my invention may take, it will be apparent to those skilled in the art that other embodiments, as well as modifications of that disclosed, may be made and practiced without departing in any way from the spirit or scope of the invention, for the limits of which reference must be made to the appended claims.

The embodiments of the invention in which an exclusive property or privilege is claimed are defined as follows:

1. A system for detecting the presence of ice, snow, frost and icing conditions on a surface as a function of moisture and temperature and providing an indication of the existence of such conditions, comprising a moisture sensing transducer and a temperature sensing transducer mounted in said surface, a bridge circuit normally balanced in the absence of the conditions to be sensed having a plurality of impedance arms and including a pair of input terminals and a pair of output terminals, said terminals defining junctions between said impedance arms, an amplifier connected to each of the output terminals of the bridge circuit, a relay connected to each of said amplifiers, a power source for said bridge, an indicator, and circuit means controlled by said relays and connecting said indicator means in circuit when both of said relays are energized, said moisture sensing transducer being connected between one of said input and one of said output terminals of said bridge forming a part of one impedance arm thereof and said temperature sensing transducer being connected between the other of said input and the other of said output terminals of said bridge forming a part of another impedance arm thereof, each of said transducers producing an impedance change in its respective impedance arm to cause an unbalance in said bridge in response to the condition to be sensed whereby an output signal responsive thereto will appear at one of its respective output terminals causing the amplifier connected thereto to amplify said signal and energize the connected relay, whereby upon the simultaneous occurrence of the proper temperature and moisture conditions on said surface both of said relays will be energized and cause said indicator to be operated to provide an indication of the existence of said conditions.

2. The invention defined in claim 1, wherein the moisture sensing transducer includes a heater and a thermostatic control means for said heater, said control means and said heater maintaining said transducer at a predetermined temperature above freezing, whereby ice, snow or frost on said transducer will be melted and converted to moisture.

3. The invention defined in claim 1, wherein the moisture sensing transducer comprises a pair of co-planar electrodes having a gap therebetween and mounted flush with said surface and an insulator in said gap, whereby moisture on said surface will also be on said electrodes, said gap being of a width such that upon the occurrence of a moisture condition the moisture will bridge the gap causing impedance change between said electrodes.

4. The invention defined in claim 3, wherein the moisture sensing transducer includes a heater and a thermostatic control means for said heater, said control means and said heater maintaining said transducer at a predetermined temperature above freezing, whereby ice, snow or frost on said transducer will be melted and converted to moisture.

5. The invention defined in claim 3, wherein the pair of coplanar electrodes comprise the end surfaces of a tubular electrode and a cylindrical electrode, said tubular electrode being externally concentric with said cylindrical electrode and connected thereto by said insulator.

6. The invention defined in claim 5, comprising in addition, means in said cylindrical electrode for mounting a heater and a control means for the heater, said control means and said heater maintaining said transducer at a predetermined temperature above freezing, whereby ice, snow or frost on said transducer will be melted and converted to moisture.

References Cited by the Examiner

UNITED STATES PATENTS

| | | | |
|---|---|---|---|
| 2,499,144 | 2/50 | Jarvis | 340—233 |
| 2,656,525 | 10/53 | Kinsella | 340—234 |
| 2,717,957 | 9/55 | Ohlheiser | 340—234 X |
| 2,755,456 | 7/56 | Bursack | 340—234 |
| 2,968,688 | 1/61 | Skinner | 200—61.04 X |
| 3,046,537 | 7/62 | Dow | 340—234 |

NEIL C. READ, *Primary Examiner.*